United States Patent
Beckers

[11] 3,860,666
[45] Jan. 14, 1975

[54] PREFERENTIAL HYDROCHLORINATION IN PERCHLOROETHYLENE PROCESS

[75] Inventor: Norman L. Beckers, Chardon, Ohio

[73] Assignee: Diamond Shamrock Corporation, Cleveland, Ohio

[22] Filed: Oct. 24, 1972

[21] Appl. No.: 299,706

Related U.S. Application Data

[63] Continuation-in-part of Ser. No. 73,661, Sept. 18, 1970, abandoned.

[52] U.S. Cl. ......... 260/654 H, 260/654 S, 260/655, 260/656 R, 260/658 R, 260/663, 423/488, 423/495
[51] Int. Cl. ............................................. C07c 21/00
[58] Field of Search ..................... 260/654 H, 654 A

[56] References Cited
UNITED STATES PATENTS
3,674,881 7/1972 Lukes et al. .................... 260/654 H

*Primary Examiner*—Howard T. Mars
*Assistant Examiner*—Nicky Chan
*Attorney, Agent, or Firm*—William A. Skinner

[57] ABSTRACT

In a process for the production of perchloroethylene in an alumina-containing fluid bed reactor, the addition to the reaction gases, prior to an anhydrous quenching step, of a preferentially hydrochlorinatable ethylenically unsaturated chlorinated hydrocarbon reduces the tendency of the trichloroethylene also contained in the reaction gases to hydrochlorinate forming unsymmetrical tetrachloroethane.

3 Claims, No Drawings

PREFERENTIAL HYDROCHLORINATION IN PERCHLOROETHYLENE PROCESS

CROSS-REFERENCE TO RELATED APPLICATION

This application is a continuation-in-part of my co-pending application Ser. No. 73,661, Norman L. Beckers, filed Sept. 18, 1970 and now abandoned.

BACKGROUND OF THE INVENTION

It is known to prepare perchloroethylene by the chlorination of hydrocarbons and/or partially chlorinated hydrocarbons, such as ethylene and ethylene dichloride in a fluid bed reactor using as the fluidizing medium various alumina and silica-containing materials. Typically these materials contain a major amount of silica and a minor amount of alumina. The products of this high temperature vapor phase reaction, in addition to perchloroethylene and anhydrous hydrogen chloride, include small amounts of unreacted chlorine, hexachlorobutadiene, and trichloroethylene. In addition, small amounts of the alumina-containing fluid bed material are apparently chlorinated and carried over with the reaction gases in the form of aluminum chloride or related materials.

These gaseous reaction products are then generally subjected to an anhydrous quenching step wherein they are contacted with a body of liquid chlorinated hydrocarbons of similar composition at reduced temperature, whereby the chlorinated hydrocarbons are converted to the liquid phase, the anhydrous hydrogen chloride remaining as a vapor and being subsequently removed for recovery. A portion of the liquid chlorinated hydrocarbons is continuously withdrawn from the quench tower and subjected to various purification procedures, particularly fractional distillation to separate the desired perchloroethylene product from the various higher and lower boiling components which are either re-circulated, for further reaction or as a cooling recycle, or passed to waste.

To a large extent the efficiency of the entire process depends upon the ease with which the various "impurities" can be removed by fractional distillation from the perchloroethylene. Owing to their similarity in boiling points, the compound most difficult to remove from the perchloroethylene (b.p. 121°C.) is unsymmetrical tetrachloroethane (U-tet, b.p. 129°C.). Once it became known by analysis of the reaction gases that U-tet is not produced in the fluid bed reactor to any significant extent, it was soon discovered that the formation of this contaminant takes place in the anhydrous quenching step, apparently by the hydrochlorination of trichloroethylene in the presence of small amounts of aluminum chloride.

STATEMENT OF THE INVENTION

It has been found that in a process for the production of perchloroethylene wherein hydrocarbons and/or partially chlorinated hydrocarbons are chlorinated in an alumina-containing fluid bed reactor, and the reaction gases containing hydrogen chloride, perchloroethylene, trichloroethylene and aluminum chloride are subsequently subjected to anhydrous quenching, the aluminum chloride-catalyzed hydrochlorination of the trichloroethylene in the quenching step may be substantially prevented by the addition of a preferentially hydrochlorinatable ethylenically unsaturated chlorinated hydrocarbon to the reaction gases. By this process the added hydrocarbon is hydrochlorinated rather than the trichloroethylene thereby producing a chlorinated hydrocarbon easily separable from perchloroethylene by fractional distillation. In this manner production is increased, heat requirements for distillation columns are decreased and product purity is improved.

DESCRIPTION OF THE PREFERRED EMBODIMENTS

The invention contemplates the addition of preferentially hydrochlorinatable ethylenically unsaturated chlorinated hydrocarbons to the described reaction gases. These compounds must meet two requirements to fall within the intended definition of the term. First, the added chlorinated hydrocarbons must undergo rapid hydrochlorination in the presence of aluminum chloride under conditions existing during the anhydrous quench operation of the described process. Second, the chlorinated products resulting from the preferential hydrochlorination must have boiling points and chemical properties such that the products do not interfere with the subsequent perchloroethylene distillation, or/and do not contaminate the product. Generally these criteria will be satisfied by any ethylenically unsaturated chlorinated hydrocarbon containing from two to four carbon atoms and having less than three chlorine atoms attached to the ethylenic carbons. Particularly suitable chlorinated hydrocarbons include vinylidene chloride and vinyl chloride.

The amount of preferentially hydrochlorinatable material required for addition to suppress the hydrochlorination of trichloroethylene is to at least some extent proportional to the amount of aluminum chloride contained in the liquid present in the quench tower. As a guideline from about 0.005 to about 0.05 mole percent of the chlorinated hydrocarbon based on the total organic components in the gases per p.p.m. of aluminum chloride should be added to the reaction gases. Larger amounts, although uneconomic, generally do no harm while smaller quantities still provide beneficial, if not optimum, results. At this time there does not appear to be any relationship between the amount of trichloroethylene present in the reaction gases and the quantity of preferentially hydrochlorinatable material that must be added. Presence of even large amounts of trichloroethylene does not require an increase in the additive, the amount of aluminum chloride present being the controlling factor.

Generally the anhydrous quenching step involves passing the reaction gases through a continuously re-circulating body of liquid chlorinated hydrocarbons of approximately the same composition as the organic components of the reaction gases. Uncondensed vapors, predominantly anhydrous hydrogen chloride, are drawn off and passed on for further treatment. Since most of the hydrochlorination reaction occurs in the liquid phase, addition of the preferentially hydrochlorinatable material is most conveniently effected by injecting the material into the gaseous reaction products prior to their entry into the body of liquid chlorinated hydrocarbons. However, it is also contemplated to add the material directly to the liquid phase with good results.

Since the invention negates the effect of the aluminum chloride as a hydrochlorination catalyst, insofar as it interferes with production or perchloroethylene, a further advantage of the invention will become appar-

TABLE

| | 1 In | 1 Out | 2 In | 2 Out | 3 In | 3 Out | 4 In | 4 Out | 5 In | 5 Out | 6 In | 6 Out |
|---|---|---|---|---|---|---|---|---|---|---|---|---|
| AlCl₃ (p.p.m.) | — | 306 | — | 328 | — | 629 | — | 314 | — | 405 | — | 425 |
| Vinyl Chloride | 0 | 0 | 0 | 0 | 0 | 0 | 2.58 | 0.27 | 2.01 | 0.36 | 2.19 | 0.72 |
| 1,1-Dichloroethane | 0 | 0 | 0 | 0 | 0 | 0 | 0 | 2.31 | 0 | 1.65 | 0 | 1.47 |
| Vinylidene Chloride | 0 | 0 | 0 | 0 | 0 | 0 | 0.98 | 0.12 | 1.00 | 1.11 | 1.91 | 0.16 |
| 1,1,1-Trichloroethane | 0 | 0 | 0 | 0 | 0 | 0 | 0 | 0.75 | 0.01 | 0.75 | 0.01 | 1.21 |
| Trichloroethylene | 1.34 | 1.24 | 2.18 | 2.01 | 0.52 | 0.43 | 26.4 | 27.9 | 19.2 | 18.0 | 22.2 | 21.1 |
| U-tet | 0 | 0.10 | 0 | 0.17 | 0 | 0.09 | 0 | 0.01 | 0 | 0 | 0 | 0.01 |
| Perchloroethylene | 50.9 | 50.9 | 49.9 | 49.9 | 53.5 | 53.5 | 19.8 | 20.7 | 22.4 | 22.3 | 13.1 | 13.2 | ent to those skilled in the art. As mentioned, the initial chlorination reaction takes place in an alumina-containing fluidized bed. The alumina content of the commercially available materials for fluidized beds varies widely, generally within the range of 13–30 percent alumina. Since the amount of aluminum chloride appearing in the anhydrous quench operation is proportional to the alumina content of the fluidized bed, it would appear that an improvement could be effected by using a material containing a lower amount of alumina. However, low alumina content materials, e.g., 13–15 percent, are not as readily available and hence are more expensive. Therefore the present invention, which negates the undesirable effect of the aluminum chloride, permits use of the more economical high alumina content materials. As a further benefit it has been noted that these high alumina content materials themselves exhibit a desirable influence upon the chlorination reaction in that they form fewer heavy end by-products.

In order that those skilled in the art may more readily understand the present invention, the following specific example is afforded.

EXAMPLE 1

In the following table Samples 1, 2 and 3 represent a partial analysis of the reaction gases from an alumina-containing fluid bed chlorination reactor, fed to an anhydrous quench tower maintained within the range of 130°–165°F. (In) and a partial analysis of the liquefied chlorinated hydrocarbons withdrawn from the quench tower (Out). Samples 4, 5 and 6 are similar analyses showing quantities of vinyl and vinylidene chloride added to the reaction gases. Numbers, with the exception of the aluminum chloride values, represent pound moles.

It can readily be seen that in Samples 1–3 portion of the trichloroethylene is hydrochlorinated in the quench tower to form U-tet, which undesirable impurity can be removed only with great difficulty from the product perchloroethylene. On the other hand Samples 4–6 show that the incorporation of comparatively small amounts of vinyl and vinylidene chlorides, even in the presence of larger amounts of trichloroethylene, results in the preferential hydrochlorination of the additives, substantially no U-tet being formed from the trichloroethylene.

Although the invention has been described with reference to a preferred embodiment thereof, it is not to be so limited since changes and alterations may be made therein, which are within the full and intended scope of the appended claims.

What is claimed is:

1. In a process for the production of perchloroethylene wherein ethylene and/or partially chlorinated ethylene are chlorinated in an alumina-containing fluid bed reactor, and the hydrogen chloride, perchloroethylene, trichloroethylene and aluminum chloride in the reaction gases are subsequently subjected to anhydrous quenching, the improvement which comprises preventing the aluminum chloride-catalyzed hydrochlorination of the trichloroethylene present in the reaction gases by the addition to the reaction gases subsequent to withdrawal from the reactor of a preferentially hydrochlorinatable ethylenically unsaturated chlorinated hydrocarbon of from two to four carbon atoms and having less than three chlorine atoms attached to the ethylenic carbons, about 0.005 to about 0.05 mole percent of the preferentially hydrochlorinatable material being added per p.p.m. of aluminum chloride present.

2. The process of claim 1 wherein the preferentially chlorinated hydrocarbon is vinylidene chloride.

3. The process of claim 1 wherein the preferentially chlorinated hydrocarbon is vinyl chloride.

* * * * *